United States Patent [19]
Nerio

[11] 3,960,387
[45] June 1, 1976

[54] MANUALLY PROPELLED TOY SNOW VEHICLE

[76] Inventor: Arnif G. Nerio, 2223 Cumberland St., Saginaw, Mich. 48601

[22] Filed: Sept. 10, 1973

[21] Appl. No.: 395,959

[52] U.S. Cl.............................. 280/12.14; 280/251
[51] Int. Cl.² ......................................... B62B 13/16
[58] Field of Search .......... 280/251, 258, 252, 243, 280/28.5, 12.13, 12.14, 12.1; 180/5 R

[56] References Cited
UNITED STATES PATENTS

| 211,868 | 2/1879 | Smith | 280/251 |
| 258,559 | 5/1882 | Crane | 280/251 |
| 1,276,587 | 8/1918 | Spaulding | 280/251 |
| 1,318,166 | 10/1919 | Matheus | 280/12.1 |

*Primary Examiner*—Robert R. Song
*Attorney, Agent, or Firm*—John J. Swartz

[57] ABSTRACT

A toy snowmobile including an endless drive track for propelling the snowmobile, and manually actuated drive members movable in to-and-fro paths of travel for alternately driving the drive track.

14 Claims, 3 Drawing Figures

MANUALLY PROPELLED TOY SNOW VEHICLE

BACKGROUND OF THE INVENTION

This invention relates to a toy vehicle and more particularly to a manually propelled toy snowmobile.

It is an object of the present invention to provide a toy snowmobile which can be manually propelled by a child.

Another object of the present invention is to provide a toy snowmobile including a new and novel drive system for driving an endless drive track.

Still another object of the present invention is to provide a toy snowmobile including manually actuated, track drive members which are driven in opposite, to-and-fro paths of travel between start and finish positions to alternately propel the vehicle.

Yet another object of the present invention is to provide a toy snowmobile of the type described including at least one endless drive member swingably mounted on the frame of the vehicle.

Other objects and advantages of the present invention will become apparent to those of ordinary skill in the art as the description thereof proceeds.

SUMMARY OF THE INVENTION

A toy vehicle including a chassis, drive track mechanism mounted on the chassis for propelling the vehicle, and manually actuated drive members for alternately driving the drive track mechanism.

The present invention may more readily be understood by reference to the accompanying drawings, in which.

Figure 1:
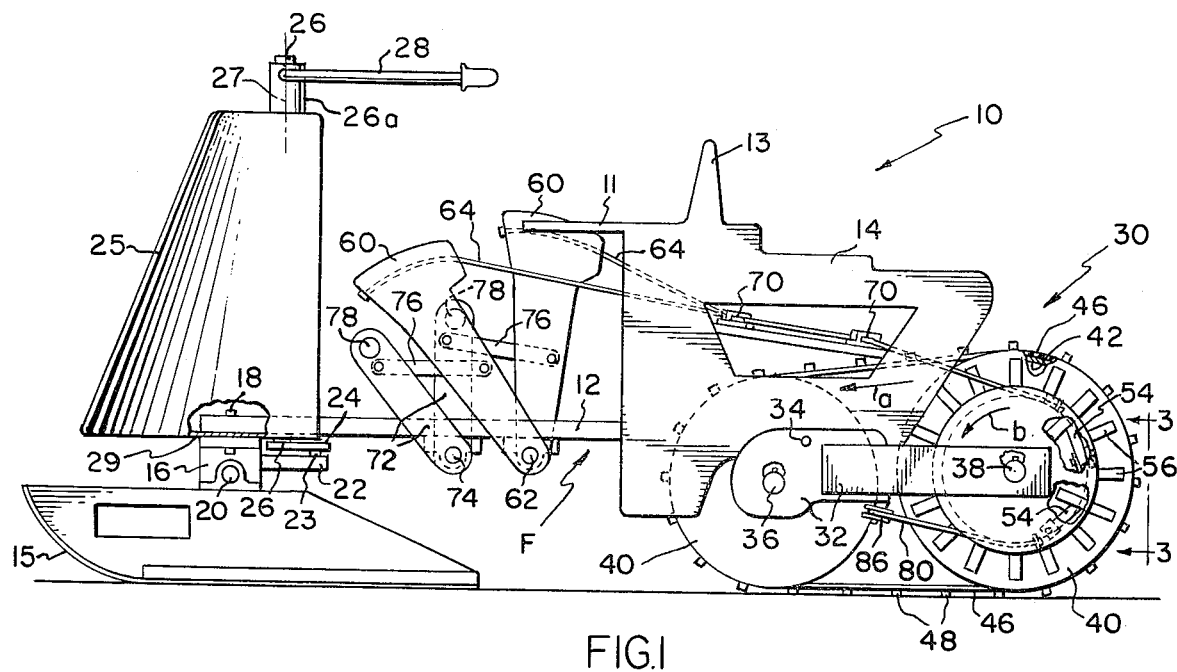
FIG. 1 is a side elevational view of a vehicle constructed according to the present invention, parts of a hood at the front of the vehicle being broken away.

A vehicle constructed according to the present invention is generally designated 10 and comprises a chassis or frame, generally designated F, including a pair of vertical side walls 14 spanned by an operator seat 11 having a back rest 13, and a forwardly extending operator platform 12. The front portion of the platform 12 is mounted on a pair of longitudinal skis 15 by a transversely extending tie rod 16 pivotally mounted on a vertical king pin 18 provided on the frame 12. The longitudinal skis 15 are connected to the tie rod 16 for vertical swinging movement by pins 20. The tie bar 16 is steerable by a rearwardly extending lug 22 pivotally connected at 23 to a bar 24 fixed to the bottom end of a vertical steering post 26 journaled on a frame supported, vertical steering column 26a. Handle bars 28 are fixed to the upper end of the post 26 for swinging the post 26 about its vertical axis 27. A hood or shield 25 covers the front of the vehicle and is mounted on the frame 12 by a lower floor portion 29.

The rear end of the snowmobile is mounted on endless drive apparatus, generally designated 30, including a pair of longitudinally extending mounting frames or rocker bars 32 pivotally mounted on the frame members 14 by pivot pins 34. The longitudinal frame members 32 journal a front axle 36 and a rear axle 38 mounting front and rear drive wheels or drums, generally designated 40. The drums 40 include hollow cylindrical walls 42 spanning a pair of slightly larger diameter end plates 44 which are journaled for rotation on the axle shafts 36 and 38. An endless drive track, generally designated 46, is trained around the drums 40 between the end plates 44 and includes a plurality of evenly spaced surface gripping lugs 48. The track 46 may comprise an endless rubber belt or webbing having integral snow gripping lugs 48.

Apparatus for driving the endless drive belt 46 in an endless path comprises a pair of cylindrical clutch plates 50 journaled at opposite ends of the rear shaft 38 by bearings 52. Lock rings 52a prevent the clutch plates 50 from moving axially on the axles 36 and 38. The clutch plates 50 mount a plurality of circumferentially spaced pivotal pawls 54 biased into engagement with a plurality of circumferentially spaced lugs or ratchet teeth 56 provided on the end plates 44 of the rear drum 40 by springs 58. As the clutch plates 50 are rotated in a counterclockwise direction, as represented by the arrow $b$ (FIG. 1), the pawls 54 will engage the ratchet teeth or lugs 56 driving the wheels 50 and track 46 forwardly. When the clutch plate 50 is rotated clockwise by apparatus to be described, the springs 58 permit the pawls 54 to pass over the ratchet teeth 56.

Apparatus for moving the clutch plates 50 in oscillating paths of travel about the axis of the rear axle 38 comprises a pair of actuator arms 60 pivotally mounted on a shaft 62 fixed to the underside of the chassis platform 12. Cables 64, trained around frame supported guide pulleys 70, are connected between the actuator arms 60 and a mounting plate 66 provided on the periphery of the clutch plates 50.

Apparatus for alternately moving the actuator arms 60 forwardly comprises a pair of levers 72 pivotally mounted on a shaft 74 fixed to the underside of the chassis platform 12. A pair of links 76 couple the levers 72 to the actuator arms 60. Laterally outwardly extending foot pedals 78 are provided at the upper ends of the levers 72 for receiving the feet of an operator supported by the seat 11. By alternately moving the levers 72 and actuator arms 60 on opposite side of the vehicle from the retracted positions to the forward positions, alternate ones of the clutch plates on opposite sides of the rear wheel 40 will be operated to drive the track 46 forwardly.

Figure 2:
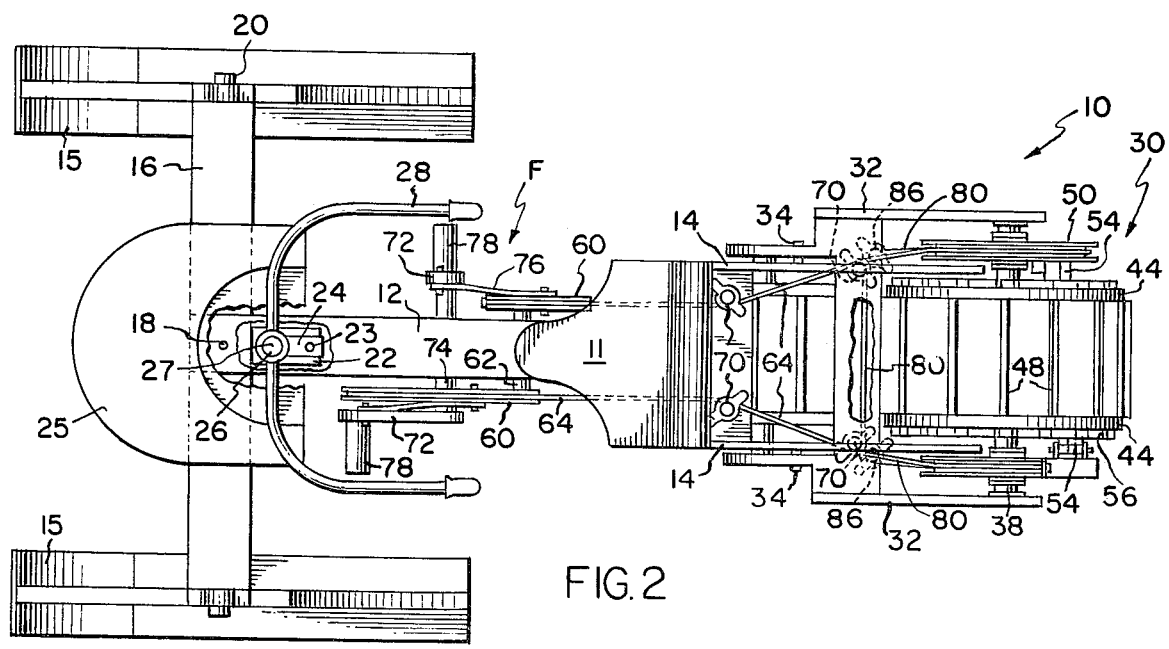
FIG. 2 is a top plan view of the vehicle illustrated in FIG. 1, part of the frame being broken away.
Figure 3:
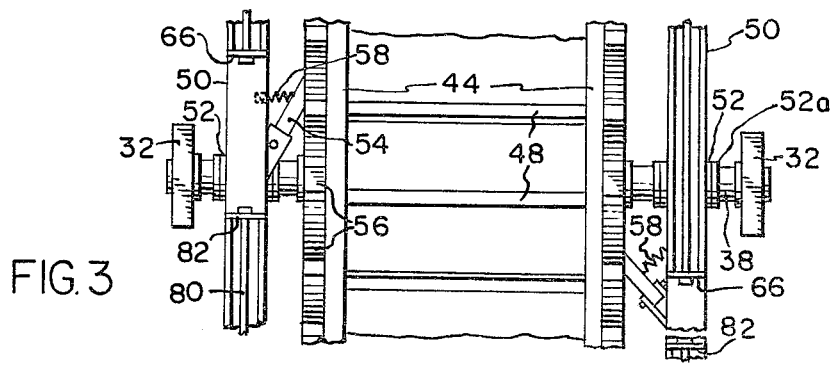
FIG. 3 is an enlarged, rear end elevational view taken along the line 3—3 of FIG. 1.

For retracting the actuator arms 60 and clutch plates 50 from the forward positions to the retracted positions, opposite ends of a cable 80 are fixed to brackets 82 provided on the undersides of the clutch plates 50. The cables 80 are trained around a pair of guide pulleys 86 mounted on the longitudinal rocker arms 32 on opposite side of the machine. The cables 64 are equal in length and the cable connectors 66 and 82 on one clutch plate 50 are circumferentially staggered from the cable connectors on the other clutch plate 50. When the actuator arm 60 on the left side of the machine (FIG. 2) is moved forwardly, to rotate the clutch plate 50 on the left side of the machine forwardly in the direction of the arrow $b$ to its finish position, the cable 80 will rotate the clutch plate 50 on the right side of the machine in a direction opposite the arrow $b$. This will draw the actuator arm 60 on the right side of the machine rearwardly to retract the clutch plate 50 on the right side of the machine to its start position. When the right hand actuator 60 is moved forwardly to rotate the right hand clutch plate 50, the left hand clutch plate is reversely rotated to its start position to draw the left hand actuator 60 rearwardly.

In operation, the vehicle is primarily utilized to traverse a snow covered surface. A child, sitting on the seat 11, rests his feet on the pedals 78 and grasps the handle bars 28 in his hands. Upon actuation of the pedals, the clutch plates 50 are alternately driven in forward and reverse oscillating paths of travel about the axis of the rear axle 38. As the clutch plates 50 rotate forwardly in the direction of the arrow b, the pawls 54 engage the ratchet teeth 56 to drive the rear drive drum forwardly to drive the endless track 46 in the direction of the arrow a. This, of course, will cause the vehicle to move forwardly. By turning the handle bars, the direction of the vehicle can be altered.

When the vehicle negotiates an obstacle, the front and rear drive drums 40 are pivoted upwardly and downwardly about the common axis of the pivot pins 34 to provide a smooth ride for the child being propelled.

It is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention or the scope of the appended claims.

What is claimed is:

1. A manually propelled toy vehicle such as a snowmobile, comprising:
    a chassis;
    propelling means mounted on said chassis for engagement with a surface to be traversed and movable in a forwardly propelling path of travel;
    first and second drive means mounted on said chassis for movement in independent, to-and-fro paths of travel between start and finish positions for alternately driving at least a portion of said propelling means to alternately move said propelling means in said propelling path of travel;
    first and second manually actuable means on said chassis for alternately moving said first and second drive means from said start positions to said finish positions;
    line means, having opposite ends anchored to said actuable means and to said drive means for alternately drawing said first and second drive means from said start positions to said finish positions as said first and second actuable means alternately move from said start positions to said finish positions; and further line means having opposite ends connected to said first and second drive means independent of said actuable means for alternately returning said first and second drive means to said start positions on said second and first actuable means, respectively, alternately move to said finish positions.

2. The apparatus of claim 1 wherein said propelling means comprises endless means, said first and second drive means comprise a pair of independently movable members, cooperating pawl means and pawl receiving means on said first and second movable members and said propelling means for moving said propelling means in one direction only as said first and second drive means move in to-and-fro paths of travel.

3. The apparatus of claim 2 wherein said pawl receiving means is on said propelling means and said pawl means is mounted on said first and second movable members for movement therewith and relative thereto toward and away from a position in which it is received by said pawl receiving means.

4. The toy vehicle of claim 1 wherein said line means includes first and second cable means connected between said first and second actuable means and said drive means; and said means reacting between said drive means comprises third cable means connected between said first and second drive means.

5. The toy vehicle as set forth in claim 1 wherein said first and second drive means comprise a pair of at least partially rotatable drive members, said line means comprises first and second line members coupled to said first and second drive means and said first and second actuable means for alternately rotating said rotatable drive members.

6. A toy vehicle, such as a toy snowmobile, comprising
    a chassis;
    propelling means mounted on said chassis for engagement with a surface to be traversed and movable in a forwardly propelling path of travel;
    first and second drive means mounted on said chassis for movement in to-and-fro paths of travel between start positions and finish positions for alternately driving said propelling means to move said propelling means in said propelling path of travel;
    first and second manually actuable means, movable on said chassis in to-and-fro paths of travel, for alternately moving said first and second drive means from said start positions to said finish positions,
    line means having opposite ends anchored to said first and second drive means independent of said actuable means, for alternately returning said first and second drive means from said finish positions to said start positions as said second and first actuable means alternately move to said finish positions; and
    means reacting alternately between said first and second drive means and said propelling means for moving said propelling means in one direction of travel as said first and second drive means move in said to-and-fro paths of travel.

7. The vehicle as set forth in claim 6 wherein said reacting means comprises pawl means on one of said propelling means and said drive means and pawl receiving means on the other of said drive means and said propelling means driving said propelling means when said drive means moves in one direction and permitting said drive means to move freely in the opposite direction.

8. The vehicle as set forth in claim 6 wherein said reacting means comprises pawl means on said drive means engageable with pawl receiving means on said propelling means.

9. The vehicle as set forth in claim 6 wherein said propelling means includes drive wheel means rotatable about an axis, said first and second drive means comprising vertical clutch plate means rotatable about said axis.

10. The vehicle as set forth in claim 9 wherein said propelling means is mounted on a shaft and said vertical clutch plate means is mounted on said shaft; and pawl means is mounted on said plate means and pawl receiving means is provided on said propelling means for receiving said pawl means.

11. The vehicle as set forth in claim 6 wherein said propelling means comprises a pair of rotatable drum means, means mounting at least one of said drum means for swinging movement on said frame means.

12. The vehicle as set forth in claim 6 wherein said propelling means comprises at least one drive wheel means, and means mounting said one drive wheel means for swinging movement on said frame means.

13. The vehicle as set forth in claim 6 wherein said propelling means comprises a pair of longitudinally extending, mounting plates pivotally mounted on said chassis, front and rear drums rotatably mounted on said mounting plates, and endless belt means trained around said drums to be driven thereby.

14. The vehicle as set forth in claim 6 wherein said first and second manually actuable means comprises lever means pivotally mounted on said chassis, cable means connecting said lever means and said first and second drive means, additionally manually actuable lever means pivotally mounted on said chassis; and means connecting said first mentioned lever means and said additional lever means for conjoint movement.

* * * * *